(12) United States Patent
Ruppert et al.

(10) Patent No.: US 6,236,969 B1
(45) Date of Patent: May 22, 2001

(54) WEARABLE TELECOMMUNICATIONS APPARATUS WITH VOICE/SPEECH CONTROL FEATURES

(76) Inventors: Jonathan P. Ruppert, 17147 Heatherwood Way, Morgan Hill, CA (US) 95037; Thomas M. Hintz; Kathleen M. Hintz, both of 7441-A Meridian Hills Ct., Indianapolis, IN (US) 46260

( * ) Notice: Subject to any disclaimer, the term of this patent is extended or adjusted under 35 U.S.C. 154(b) by 0 days.

(21) Appl. No.: 09/127,362

(22) Filed: Jul. 31, 1998

(51) Int. Cl.[7] ....................................................... G10L 11/00
(52) U.S. Cl. ............................................ 704/275; 704/270
(58) Field of Search ............................... 704/275; 455/79, 455/90; 379/61

(56) References Cited

U.S. PATENT DOCUMENTS

| | | |
|---|---|---|
| 4,459,674 | 7/1984 | Sakurai . |
| 4,484,029 * | 11/1984 | Kenney ................................... 455/90 |
| 4,497,980 | 2/1985 | Gorman . |
| 4,558,178 | 12/1985 | Yasuda et al. . |
| 4,864,622 | 9/1989 | Iida et al. . |
| 4,882,745 * | 11/1989 | Silver ..................................... 455/90 |
| 4,945,570 * | 7/1990 | Gerson ................................... 455/79 |
| 4,991,197 | 2/1991 | Morris . |
| 5,042,063 | 8/1991 | Sakanishi et al. . |
| 5,191,602 | 3/1993 | Regen et al. . |
| 5,335,261 | 8/1994 | Fujinaka . |
| 5,483,579 | 1/1996 | Stogel . |
| 5,487,102 | 1/1996 | Rothschild et al. . |
| 5,509,049 | 4/1996 | Peterson . |
| 5,793,865 * | 12/1998 | Leifer ................................... 379/430 |
| 5,850,439 * | 12/1998 | Yang ..................................... 379/395 |

OTHER PUBLICATIONS

Hitachi, "Hitachi Advertisement," Fortune Magazine, 1st ed., Fortune Magazine, vol. 1, No. 1,) p. 1, (Jul. 21, 1997).

* cited by examiner

Primary Examiner—David D. Knepper
Assistant Examiner—Robert Louis Sax
(74) Attorney, Agent, or Firm—Baker & Daniels

(57) ABSTRACT

A wearable communication apparatus is in the form of a self-contained telephone headset that includes an integral antenna, stand-alone power supply and on-board electronics and circuitry for RF and I/R communication. The headset includes a mouthpiece that is rotatably mounted to a central housing that contains the bulk of the apparatus electronics. The mouthpiece includes an ear speaker and microphone, as well as the rechargeable power supply. The rotating end of the mouthpiece includes an array of electrical contacts that are configured to contact a complementary contact array on the central housing. The electrical contacts provide for the communication of electrical power and information between the mouthpiece and its components and the central housing and its components. The headset can be activated by rotation of the mouthpiece into its operative position and deactivated by rotation out of this position. In the deactivated position, the contact array on the mouthpiece can provided electrical communication with complementary contacts on a base unit. The base unit also provides means for integrating the headset into a local telephone network, The base unit can be connected to the network via a traditional landline, and communicate with the headset via an RF antenna. The headset includes voice recognition capabilities that allow the user to dial telephone numbers, access a memory of stored numbers, and direct certain headset functions simply by spoken commands.

9 Claims, 7 Drawing Sheets

WEARABLE TELECOMMUNICATIONS APPARATUS WITH VOICE/SPEECH CONTROL FEATURES

REFERENCE TO RELATED APPLICATIONS

Subject matter in the present application is included in Disclosure Document No. 403212, filed on Aug. 1, 1996.

BACKGROUND OF THE INVENTION

This invention relates generally to the field of telephony, and more particularly to an apparatus integrating voice recognition, cellular phone technology and telephone headsets.

Presently, a plurality of headset devices are available for use in a typical PBX or telephone system. A variety of such headsets are disclosed in the Hello Direct Catalog, Spring 1997, and in U.S. Pat. No. 4,882,745 to Silver. In U.S. Pat. No. 5,487,102 to Rothschild, Ralph F., et al., a headset interface is disclosed that is connected to the public telephone network at a central office. The system includes automated voice features that alleviates the need for an operator to vocalize greetings and responses to users of the telephone system. This system relies upon standard groundline based telephony, rather than cellular technology.

Cellular technology has been widely applied to car telephone systems. For example, a standard car mounted cell phone with a keypad on the hand set is disclosed in U.S. Pat. No. 5,335,261 to Fujinaka. Dialing a phone number via the keypad is awkward and potentially unsafe while operating a moving vehicle. Even when the portable phone is removed from the vehicle-mounted base, the cell phone mounted keypad still presents the same difficulties to dialing while a person is in motion or in an environment where being visually distracted can be problematic. The cell phone system in the '261 Patent includes a speaker phone feature that frees a driver from having to hold the phone in the car, but this feature only adds marginally to the overall convenience and safety of the device.

Telephone headsets have been proposed for use with cellular systems, such as the system disclosed in U.S. Pat. No. 5,191,602 to Regen et al. The headset shown in this patent fails to eliminate many of the problems of using a cellular device. For example, when using the cellular phone in an automobile, the driver is required to be connected to a slave unit containing electronic circuitry that purports to provide a transparent interface between the headset and the existing cell phone. With this system, the headset is directly connected by a cord to the cellular device. Moreover, as with a standard car phone, the user of the headset shown in the '602 Patent is still required to dial using the keypad on the cellular device.

So-called "wearable" cellular phones have been recently promoted. One such compact telephone can be worn as a necklace around the neck. The device described in the article is not useable when being worn. Additionally a conventional extendable antenna is required along with a keypad for dialing. This invention is consistent with the current state of the art devices that require the user to use their hands to operate the device.

In U.S. Pat. 5,042,063 to Sakanishi, a telephone apparatus is disclosed in which a call may be made in response to utterances of a user by speech recognition without manually dialing a telephone number. However, the system still requires some keypad functions in order to communicate, so that is does not permit true hands free operation.

SUMMARY OF THE INVENTION

In view of the limitations of the prior communication systems, the present invention contemplates a highly flexible headset communication apparatus. The headset apparatus is self-contained, meaning that it includes its own power source, communications link and circuitry to maintain remote, non-land based communications. In one application, the headset apparatus of the present invention permits use with a base unit linked to an office or landline telephone system. The same headset can be used for remote cellular communication outside the office.

In one embodiment, the headset apparatus includes a port and circuitry for I/R communications with external hardware. For example, in one mode of operation, the user can send and receive data to and from a personal computer, or an ATM.

In one important feature of the invention, the headset is provided with electronics/software for voice recognition. The headset permits voice activation of the headset, voice dialing and audible commands. The apparatus includes electronics to recognize whether the user has issued a voice command, to determine the nature of the audible command, and to control the operation of the headset in response to the spoken word. In one embodiment, the headset apparatus can distinguish between spoken numbers and spoken words. The headset includes electronics to permit spoken number dialing, and to access a database of telephone numbers referenced by spoken words.

In conjunction with the voice recognition features, the headset includes electronics and software for user recording of voice commands. A voice recognition processing unit (VRPU) within the headset processes verbal input and stores a translated version of the spoken words in a local memory. The VRPU can then compare future spoken commands with the translated version in memory to then issue an appropriate electronic command to the headset components.

In one beneficial feature of the invention, advanced antenna technology incorporated into the headset. The advanced antenna overcomes interference and signal degradation that is typically associated with cellular communications. A renewable power supply, such as a rechargeable lithium battery, adds to the flexibility of the inventive telephone headset.

In another feature of the invention, the headset includes a mouthpiece that is rotatably connected to the central housing of the apparatus. The mouthpiece includes a housing end that fits within a complementary configured recess in the housing. An array of electrical contacts are disposed on both the housing recess and the housing end of the mouthpiece. The electrical contacts transmitted electrical energy between the components in the central housing and the components in the mouthpiece, such as the ear speaker and microphone. In addition, the headset apparatus can be energized or de-energized by rotating the electrical contact arrays into and out of electrical connection.

In one feature associated with the rotatable mouthpiece, the electrical contacts at the housing end are arranged to contact corresponding electrical contacts on the base unit. With the mouthpiece rotated into a position in which the headset is not energized by its own power supply, the headset can be linked to the base unit. The base unit can be used to recharge the on-board power supply of the headset. In addition, the base unit can be used to maintain communication through the headset speaker and microphone.

It is an object of the present invention to provide a highly integrated wearable cellular telephone apparatus that is incorporated into a headset. Having the power source, control circuitry and antenna built in to the headset offers a significantly compact and portable communication device that can be operated safely in or out of a vehicle or the office.

It is a further object of the invention to provide a wearable communication system which reduces need for having a separate phone device for your vehicle, home, office or other locations to be fixed. Features of the system allow connection to a PBX or use as a remote stand-alone cellular phone.

It is further an object of the present invention to function with a wireless infrared communication port to transmit data from a computer laptop or other device and to forward the data via the cellular network to other computers or systems.

One benefit of the present invention is achieved by features of the wearable headset that permit voice activated commands. Other objects and advantages will become apparent from a consideration of the ensuing description and accompanying drawings.

DESCRIPTION OF THE PREFERRED EMBODIMENT

Figure 1:
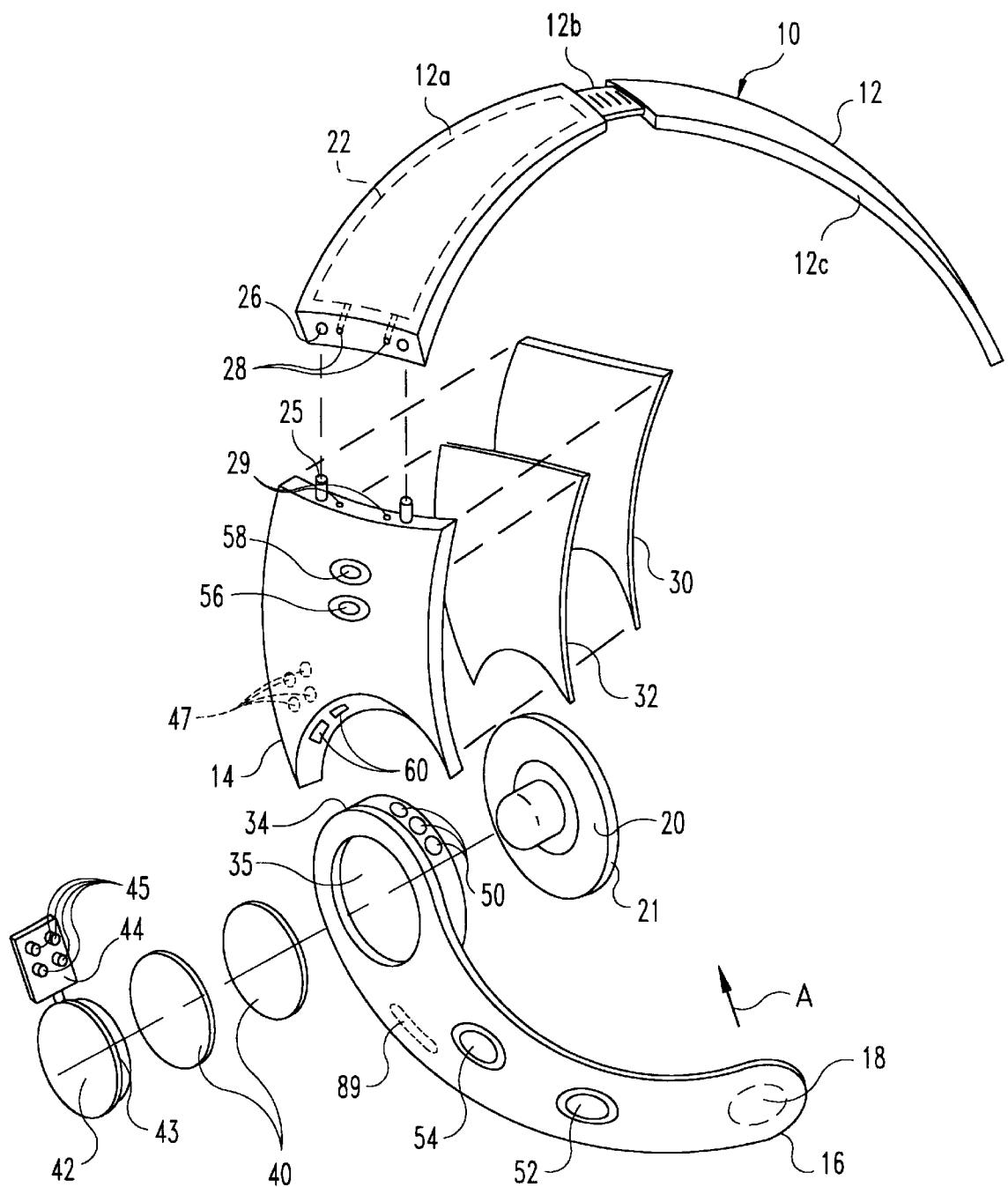
FIG. 1 is an exploded perspective view of the components of a cellular headset according to one embodiment of the present invention.

For the purposes of promoting an understanding of the principles of the invention, reference will now be made to one preferred embodiment illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

In accordance with one embodiment of the invention, a telephone headset 10 is provided with a headband 12 configured to be supported on the head of a user. The headband 12 is attached to an electronics housing 14 that contains electronic components used with the telephone headset 10. The electronics housing 14 pivotally supports a movable mouthpiece 16 that is configured to wrap around from the side of the face of the user to the front adjacent the user's mouth. The mouthpiece 16 includes a microphone 18 that is mounted at the end of the mouthpiece. Thus, it should be apparent that the mouthpiece 16 is configured so that the microphone 18 can be disposed immediately adjacent the mouth of the user. In one specific embodiment, the microphone 18 is a sub-miniature condenser microphone having an even cardioid unit directional response over the speech bandwidth. In this specific embodiment, the microphone 18 assures extremely low sensitivity to mechanical vibration and reduces handling noise as the mouthpiece 16 is manipulated. In a further specific embodiment, the microphone 18 can include a back-electret element and an integral preamplifier for a refined and accurate signal.

The telephone headset 10 further includes an ear speaker 20 that is engaged within the mouthpiece 16 at the opposite end from the microphone 18. An ear cushion 21 is provided so that the microphone can be supported and seated against the ear of the user. The headband 12 is provided in adjustable sections. The band includes a fixed section 12a that is attached to the electronics housing 14. A strap 12b extends from the fixed section and is adjustably engaged by a movable section 12c. In this respect, the headband 12 can be of a conventional design to permit adjustment to accommodate the head of the user. The movable section 12c can be provided with a counterweight at its free end to balance the weight of the headset components on the user's head.

In the preferred embodiment, the fixed section 12a is engaged to the electronics housing 14 by way of a pair of attachment pins 25 and corresponding attachment recesses 26. In the illustrated embodiment, the pins 25 are shown as extending from the electronics housing 14, while the recesses are disposed within the fixed section 12a of the headband 12. Of course, the pins and recesses can be reversed in their location. In this embodiment, the pins are configured for removable press fit engagement within a corresponding recess to firmly hold the headband 12 and electronics housing 14 together.

In one feature of the invention, the telephone headset 10 is provided with an antenna 22 that is disposed within the headband 12, and preferably the fixed section 12a. In one specific embodiment, the antenna 22 can utilize advanced strip technology to reduce the profile of the antenna to fit within the headband 12.

Two sets of mating contacts 28 and 29 are respectively connected to the headband 12 and electronics housing 14. These contacts provide electrical connection between the antenna 22 and electronics disposed within the electronics housing 14.

Looking again at the mouthpiece 16, a housing 34 is provided adjacent the speaker 20. The housing preferably includes means for supporting the speaker 20 at one face of the housing (not shown). The housing 34 further defines a battery compartment 35 for receiving battery cells 40. Preferably, the batteries 40 are capable of providing five volts DC power to the electronics of the telephone headset 10. In specific embodiments, the batteries can be standard lithium disk cells, as depicted in FIG. 1. In an alternative embodiment, the disk cells can be replaced by a conformal battery that is configured to fit within the electronics housing 14 or a component of the headband 12.

The electronics housing 14 defines a hinged recess 37 within which the housing 34 of the mouthpiece 16 can rotatably reside. The electronics housing 14 further provides a compartment for housing a cellular communication electronics component 30 and a headphone control electronics component 32. Preferably, these two components 30, 32 are standard integrated circuit boards carrying the various electronic components for the appointed functions.

The battery compartment 35 of the housing 34 is closed by a cap 42. The cap 42 includes a cylindrical hinge portion 43 that is preferably configured to be pressed into the battery compartment 35. In a specific embodiment, the hinge portion 43 and the battery compartment 35 can form a circumferential pivoting hinge, such as a ridge and groove configuration, so that the mouthpiece 16 can be pivoted in the direction of the arrow A about the hinge portion 43.

The cap 42 further includes an attachment plate 44 providing a means for supporting the hinge portion 43 relative to the electronics housing 14. The attachment plate 44 can include a plurality of pins 45 that are adapted to be press fit into corresponding recesses 47 defined in the electronics housing 14. The attachment plate 44 is configured so that the housing 34 pivots in close proximity and preferably direct contact with the hinge recess 37 of the electronics housing 14. It is understood that the cap 42, with its hinge portion 43 and attachment plate 44, is one manner for pivotably supporting the mouthpiece 16 relative to the electronics housing 14. Other hinge type supports are contemplated, provided that they maintain a direct pivoting contact between the housing 34 and the hinge recess 37.

Figure 2:
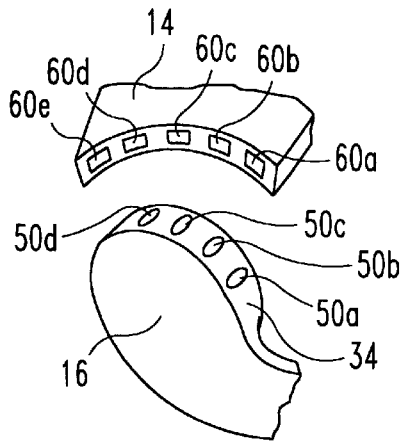
FIG. 2 is a partial exploded view of the electrical contacts between the mouthpiece and the electronics housing.

The importance of this direct contact can be appreciated with reference to the electrical contact array 50 that is disposed on the outer portion of the housing 34. This contact array 60 is in direct electrical connection with a corresponding contact array 60 mounted to the surface of the hinge recess 37 of the electronics housing 14. The relationship between the two contact arrays 50 and 60 are shown in the detailed view of FIG. 2. The contact array 50 can include individual electrical contacts $50_A$–$50_E$ (note that contact $50e$ is hidden from view in FIG. 2). A corresponding number of contacts $60_A$–$60_E$ are provided in the array 60 in the electronics housing 14. In a specific embodiment, the contacts $50_A$ and 60A can correspond to an electrical interface with the microphone 18. The contacts $50_B$ and $60_B$ provide volume control, while the contacts $50_C$ and $60_C$ are the electrical connections for the speaker 20. The final pair of contacts in each array is power contacts.

Each of the electrical contacts in the two arrays 50 and 60 can be of conventional design that provides for direct sliding contact. In one specific embodiment, the contacts $60_A$–$60_E$ can be somewhat elongated around the innercircumference of the hinge recess 37. In this manner, direct electrical connection with the corresponding contact $50_A$–$50_E$ can be maintained even as the mouthpiece 16 is pivoted relative to the housing 14.

The telephone headset 10 can include a pair of volume control buttons 52 and 54 mounted to the mouthpiece 16. The pushbutton switches can be used to increase the volume heard through the speaker 20. Signals from the volume control switches are passed to the headphone control electronics component 32 by way of the electrical contacts $50_B$ and $60_B$. Similarly, signals from the microphone 18 are passed to the electronics component 32 through the contacts $50_A$ and $60_A$, while signals travel to the speaker 20 by way of the electrical contacts $50_C$ and $60_C$.

The electronics housing 14 can carry an array of visual indicators. For example, a power indicator 56 can be provided to indicate that the phone headset is activated. This activation occurs when the mouthpiece 16 is pivoted relative to the electronics housing 14 so that the power electrical contacts $50_{D,E}$ engage the contacts $60_{D,E}$. When the headset 10 is in use for telephone communication or other type of data transmission, a busy indicator light 58 can be illuminated by circuitry within the electronics component 32. In the case of both indicators 56 and 58, a low-power LED can be utilized. In other specific adaptations, the LEDs can be illuminated in different colors to provide different indications. For example, the power LED 56 can be red when the telephone headset 10 is activated, and green when the batteries 40 are low on charge. Similarly, the in use LED 58 can be illuminated red when the user is making use of the headset 10 and can be illuminated a flashing green when an incoming call is being received by the unit. Of course it is understood that both the electronics housing 14 and the mouthpiece 16 can be provided with other visual indicators, such as the LEDs 56 and 58, to act as annunciators for various functions of the telephone headset 10.

Figure 3:
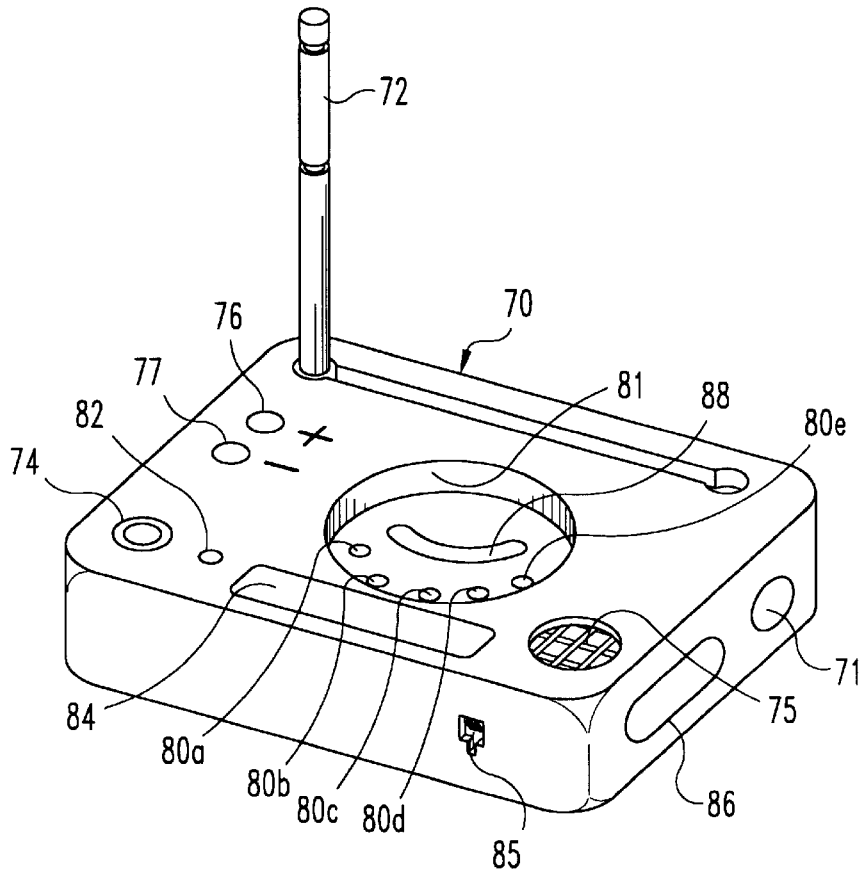
FIG. 3 is a top perspective view of a base unit for use with the cellular headset shown in FIG. 1.

A further component of the present invention is the base unit 70 shown in FIG. 3. The base unit 70 can include a power input 71 which can provide for connection to an AC source of power. The unit also includes a retractable and extendable antenna 72 to provide a communication link to the telephone headset 10 by way of the antenna 22. The base unit can also include a microphone 74 and a speaker 75 to establish two-way communication between the base unit and a variety of telephone headsets 10. Two volume control switches 76 and 77 can also be provided to adjust the volume of the signal received over the speaker 75.

Figure 4:
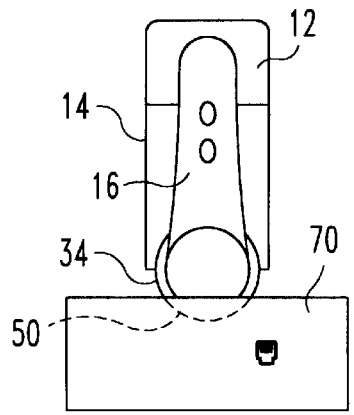
FIG. 4 is a side elevational view of the headset shown in FIG. 1 mounted on the base unit shown in FIG. 3.

In one feature of the invention, the base unit 70 provides a means for supporting and providing electrical contact with the telephone headset 10. Specifically, an array of contacts $80_A$–$80_E$ is provided within a support recess 81 defined in the top face of the base unit 70. The support recess 81 is configured to receive a portion of the housing 34 of the mouthpiece 16, in a manner shown in FIG. 4. In this configuration, the mouthpiece 16 is pivoted upward in the direction of the arrow A in FIG. 1 so that the arm of the mouthpiece substantially overlies the electronics housing 14. In this orientation, the electrical contact array 50 is exposed beneath the telephone headset 10. When the headset 10 is mounted within the support recess 81, the electrical contact array 50 is exposed to and in electrical contact with the corresponding electrical contacts in the base unit 70. Thus, the corresponding contacts $50_A$, $50_B$ have complimentary mating contacts $80_A$, $80_E$ within the base unit. The power and ground contacts $80_D$ and $80_E$ of the base unit are used to provide a recharging capability for the batteries 40 of the telephone headset 10. Thus, in this instance, the batteries 40 are preferably rechargable lithium type batteries. When the telephone headset 10 is mounted within the base unit 70 for recharging, an indicator light 82 can be illuminated to shown the recharging function is occurring. With the telephone headset 10 mounted to the base unit 70, the microphone and speaker of the telephone headset 10 are electrically connected to the base unit, rather than to the control electronics component 32 of the telephone headset 10.

In further features of the base unit 70, a display 84 can be provided for various messages. Circuitry within the base unit 70 can provide messages on the display 84 to indicate the origination of an incoming call, the duration of a call, and other information of interest.

So that the base unit 70 can operate within a telephone system, it is provided with a jack 85 for engaging a conventional telephone ground wire. This jack 85 can be an RJ45 jack as is known in the art. In addition, the base unit 70 is provided with a serial interface jack 86 that can be engaged by a serial cable to a data source, such as a personal computer. In this respect, the base unit 70 can be used to transmit serial data to a telephone headset 10. To effect this function, the base unit 70 includes an I/R interface 88 that can transmit an infrared signal to a telephone headset 10. The headset 10 can therefore be provided with a corresponding I/R interface 89, located on the underside of the mouthpiece 16. Circuitry within the headphone control electronics component 32 can be used to receive and condition signals transmitted via the I/R interfaces 88 and 89. In this aspect, the signals can pass from the mouthpiece 16 to the electronics housing 14 though the microphone contacts $50_A$ and $60_A$.

It is understood that the I/R port 89 in the telephone headset 10 can be situated in a variety of locations on the headset. In addition, multiple I/R ports can be provided for greater ease of use of this communication aspect. If properly located on the headset, the I/R ports provide means for headset-to-headset communications. The I/R port 89 can also provide an interface to I/R ports on other data transmission devices, such as computers, printers, ATMs and the like. Using components of the headset described herein, a user can enable half or full-duplex communication with a computer or peripheral device. The I/R port can transmit verbalized commands that have been translated using speech synthesizer technology, to control the computer or peripheral.

Figure 5:
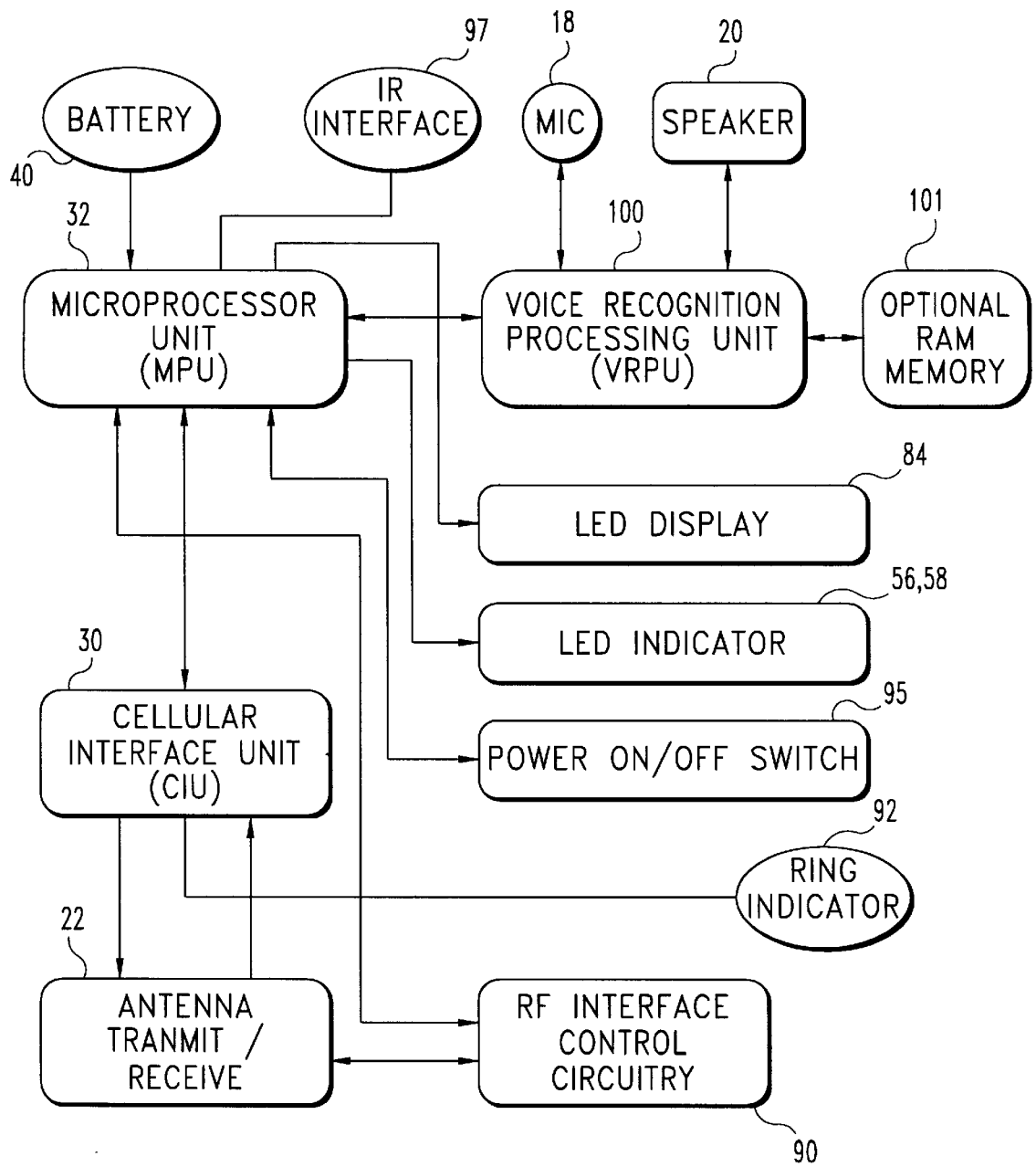
FIG. 5 is a diagrammatic representation of the electronic components of the cellular headset shown in FIG. 1.

Referring now to FIG. 5, the general electronics of the telephone headset 10 are depicted diagramatically. As indicated above, the telephone headset 10 includes a cellular communication electronics component 30 that includes circuitry for receiving and processing cellular communications over the antenna 22. In one specific embodiment, the cellular component 30 is integrated with RF interface control circuitry 90 that provide for reception and transmission of RF signals over the antenna 22. Such RF control circuitry 90 is well known in the art, as is the electronics necessary for the cellular interface, as part of the cellular communication electronics component 30. Again, as indicated above, this component is provided as an integrated circuit board or wafer that is configured to be mounted within the electronics housing 14 of the telephone headset 10. The cellular communication component 30 also controls a ring indicator 92. The ring indicator can be a typical electromechanical device that provides an audible sound when a cellular telephone transmission is being received at the antenna 22. The indicator 92 can also constitute or include a vibratory indicator that vibrates when an incoming call is received Signals processed by the cellular interface component 30 are transmitted to the headphone control electronics component 32 for additional processing and transmittal to and from the microphone 18 and speaker 20. The electronics component 32 is powered by a battery 40, with the control electronics component 32 distributing power to the remaining electrical components of the telephone headset 10.

The headphone control electronics component 32 can be provided with a separate power on/off switch 95 (not shown). However, most preferably, the power on/off switch 95 is integrated with the contacts $60_D$ and $60_E$. When the power circuit is completed through the contacts $50_D$ and $50_E$ of the mouthpiece 16, the power switch 95 is activated. In this instance, a signal is provided to the electronics component 32, which then illuminates the appropriate LED indicator 56, 68. When the telephone headset 10 is mounted on the base unit 70, the control electronics 32 can also be used to drive the LED display 84 mounted to the base unit 70. In addition, the telephone headset 10 can be provided with I/R interface circuitry 97 that process I/R signals through the control electronics component 32.

In one important aspect of the invention, the microphone 18 and speaker 20 are electrically connected to the control electronics component 32 by way of a voice recognition processing unit 100. The VRPU 100 can be provided with an optional RAM memory 101 for storing a variety of voice recognition information, as described in more detail below. The VRPU 100 provides an important benefit to telephone headset 10 of the present invention. Specifically, the VRPU can translate audible instructions into electronic instructions to direct the mode of operation of an activity of the telephone headset 10. In this way, the telephone headset 10 is truly a hands-free cellular telephone, in contrast to the traditional prior cellular phone that utilizes a keypad for data entry.

The voice recognition processing unit 100 can include a number of application specific integrated circuits (ASIC) to perform a variety of voice recognition functions. For example, one ASIC can be utilized for electronic dialing. This particular ASIC is configured to recognize spoken numbers corresponding to a telephone dialing command. A second ASIC can provide for general speech recognition to recognize specific commands used to operate the telephone headset. A third ASIC can provide means for programming the memory 101 of the VRPU 100 to store various spoken numbers and word commands. A further ASIC can process a variety of spoken instructions for controlling certain functions of the telephone headset 10. Each ASIC includes circuitry for recognizing and processing spoken numbers and words and providing an appropriate signal to the headphone control electronics component 32 for subsequent electrical processing.

The VRPU 100 can also include voice recognition ASICs that permit the headset to "speak" to the user. For example, when an incoming call is received by the cellular interface unit 30, a signal can be generated by the VRPU directing speech simulation software to send an audible, spoken message to the speaker 20. For instance, the message can be the words "You have a call". Other spoken messages can be generated by the headset VRPU 100 depending upon the headset activity.

Figure 6:
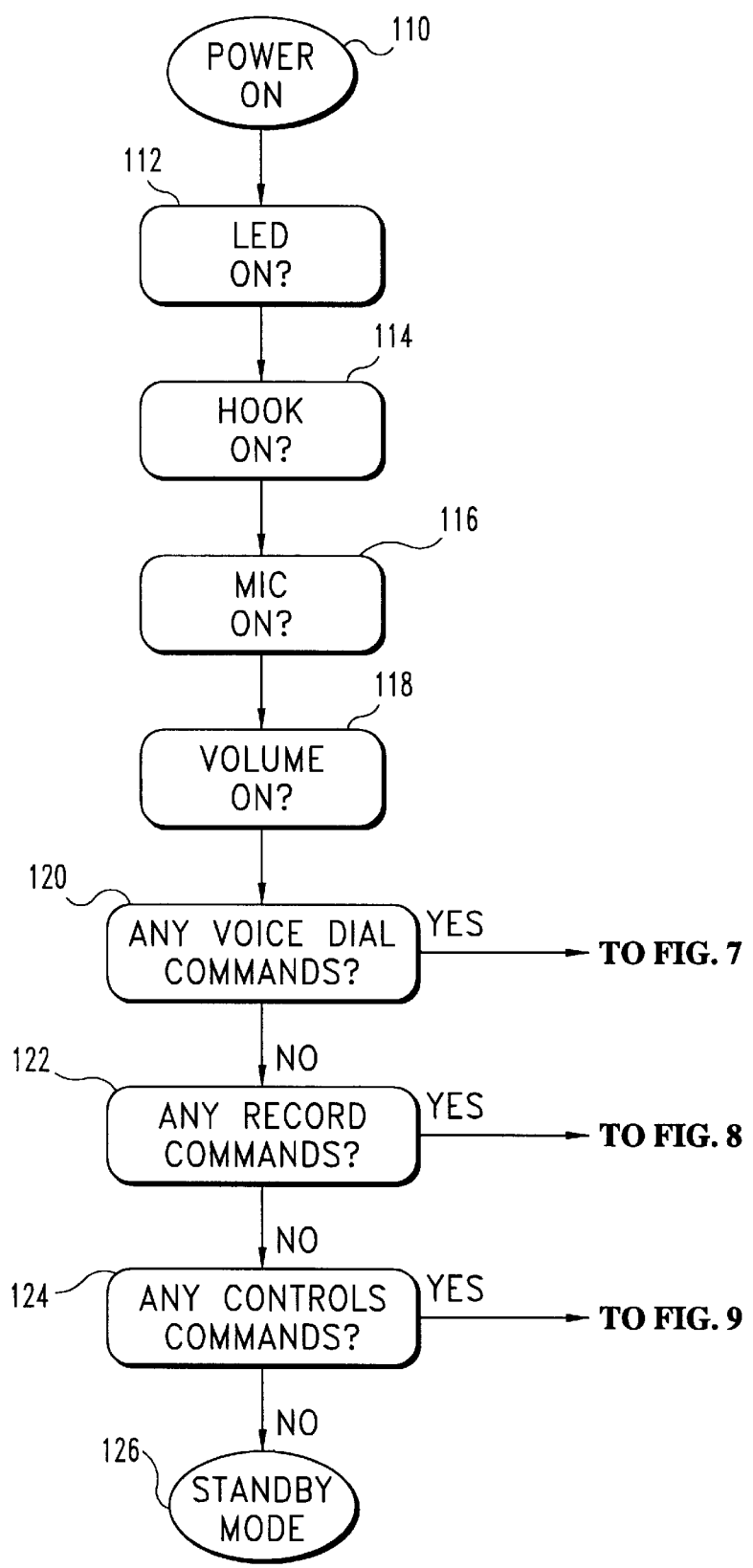
FIG. 6 is a generalized flowchart of the functions performed by the electronics diagrammed in FIG. 5.

In one specific embodiment, the electronics of the control electronics component 32 and the VRPU 100 execute a sequence of general instructions as shown in FIG. 6. When power to the unit is activated in the initial step 110, the power on indicator LED is illuminated in step 112. In the subsequent steps 114, 116 and 118, the various electrical components of the telephone headset 10 are activated, specifically, the mouthpiece 16 is activated at the hook on step, the microphone in the next step, and the volume controls in step 118.

In the following steps 120, 122 and 124, a command recognition ASIC within the VRPU 100 determines whether a spoken command is given corresponding to one of the three illustrated functions. Specifically, the recognition ASIC determines whether a voice dial command is being requested in step 120, a recording command is issued in step 122, or further telephone headset control commands being expressed in step 124. If no audible commands are issued, the telephone headset 10 goes into a standby mode 126. The standby mode is controlled by the control electronics component 32 which permits reduced power usage while keeping the telephone headset 10 activated to receive incoming calls. Once an incoming call is received by the cellular interface component 30, the incoming signal awakes the control electronics component 32 so that full power can be supplied to the remaining electronics of the telephone headset 10.

Figure 7:
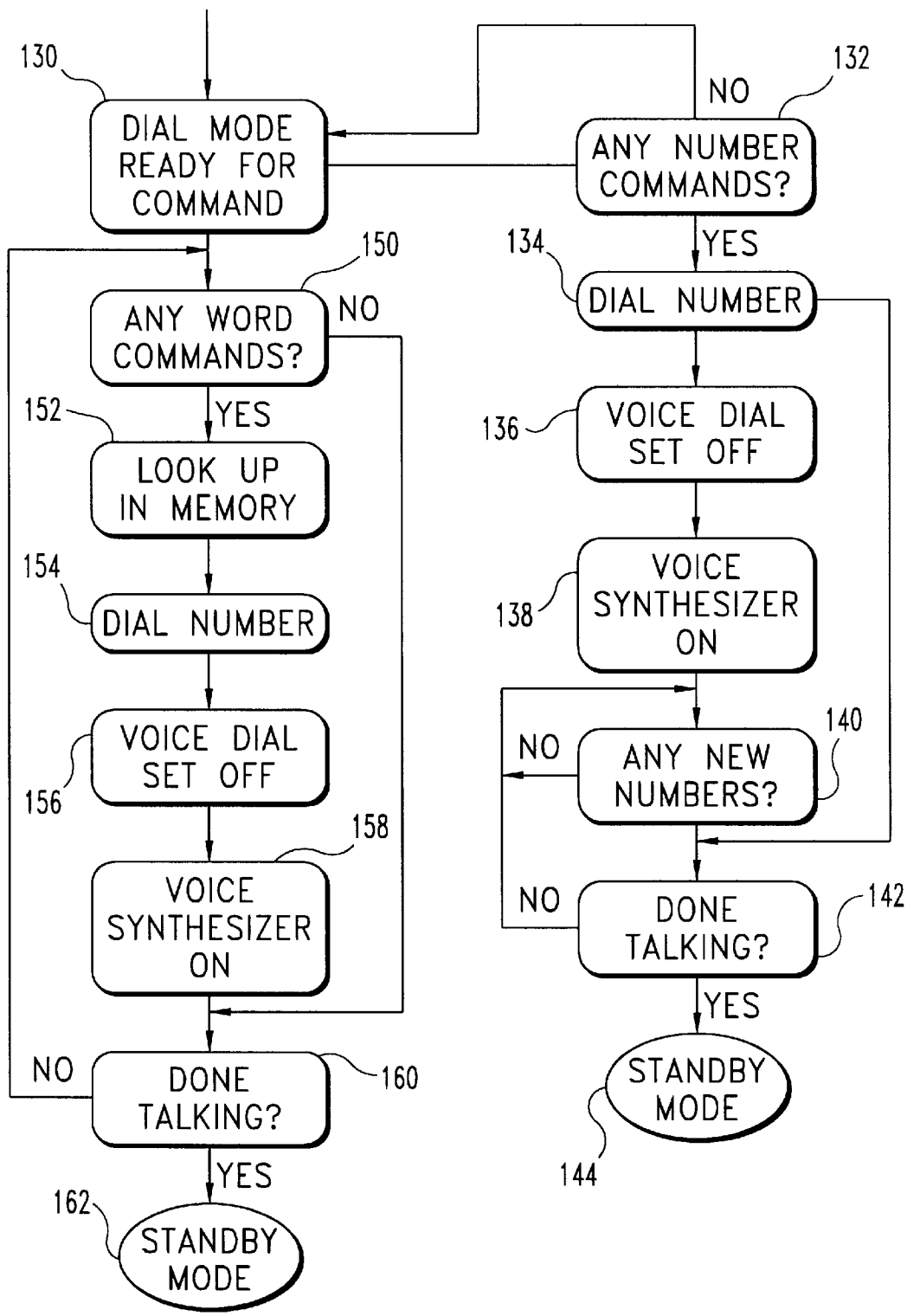
FIG. 7 is a detailed flowchart of one step shown in the flowchart of FIG. 6 for executing voice commands.

Referring now to FIG. 7, a flowchart of commands executed by a dialing ASIC within the VRPU 100 is illustrated. If a voice dial command is issued in step 120 (FIG. 6), control is passed to the dialing ASIC which is placed in step 130 in a ready mode to receive a dial command. This control transfer can be initiated by an audible command such as "dial" which is recognized by the command control ASIC. Once control is passed to the dialing ASIC, a determination is made as to whether the next verbal intonation by the user is a number or a word command. A test is conducted in step 132 to determine whether the spoken input is a number command. Thus, the dialing ASIC 66 will include an array of recognized numbers as spoken by the particular user, i.e. "one", "two", etc. If the dialing ASIC recognizes a number, control passes to step 134 in which the spoken number is converted to an electronic dialing command to dial the spoken number. Once the number has been dialed, the voice dialing sequence is turned off in step 136 so that any further spoken numbers by the user will not be interpreted as a dialing command. At this point, direct voice communication can be conducted by the user through the telephone headset 10. In an optional step 138, a voice synthesizer within the VRPU 100 can be activated. The voice synthesizer can issue audible requests through the speaker 20. For example, in step 140, the voice synthesizer can request whether any new numbers need to be dialed by the dialing ASIC. If the answer is yes, then control passes back to step 134 in which the number is spoken by the user and dialed by the dialing ASIC. The voice synthesizer can further request in step 142 whether the user is finished with the current conversation. If the enunciated answer is yes, then control passes to the standby mode at step 144.

Referring back to the beginning of the flowchart in FIG. 7, if a number command is not issued to the ASIC in step 132, control passes to step 150. In this step it is determined whether a word command is being issued that is recognized by the VRPU 100. If no word is uttered, control passes down to step 160. On the other hand, if a word dialing command is issued in step 150, control passes to the next step 152 in which the spoken word is looked up within the memory 101. At this instance, the word command can simply be the name of a person to be called. This name can be stored within a look-up table in the RAM memory 101 to be accessed by the VRPU 100. The dialing ASIC determines a match between the spoken word and the stored word, and the appropriate telephone number is electronically extracted from the memory 101. In the next step this number is passed to the control electronics component 32 to perform the dialing function. As with the branch corresponding to number commands, the voice dialing activation is turned off in step 156 and the voice synthesizer activated in step 158. In step 160 the dialing ASIC requests whether the user is done with the conversation, and if the answer is yes the telephone headset 10 is passed to the standby mode in the final step 162.

Figure 8:
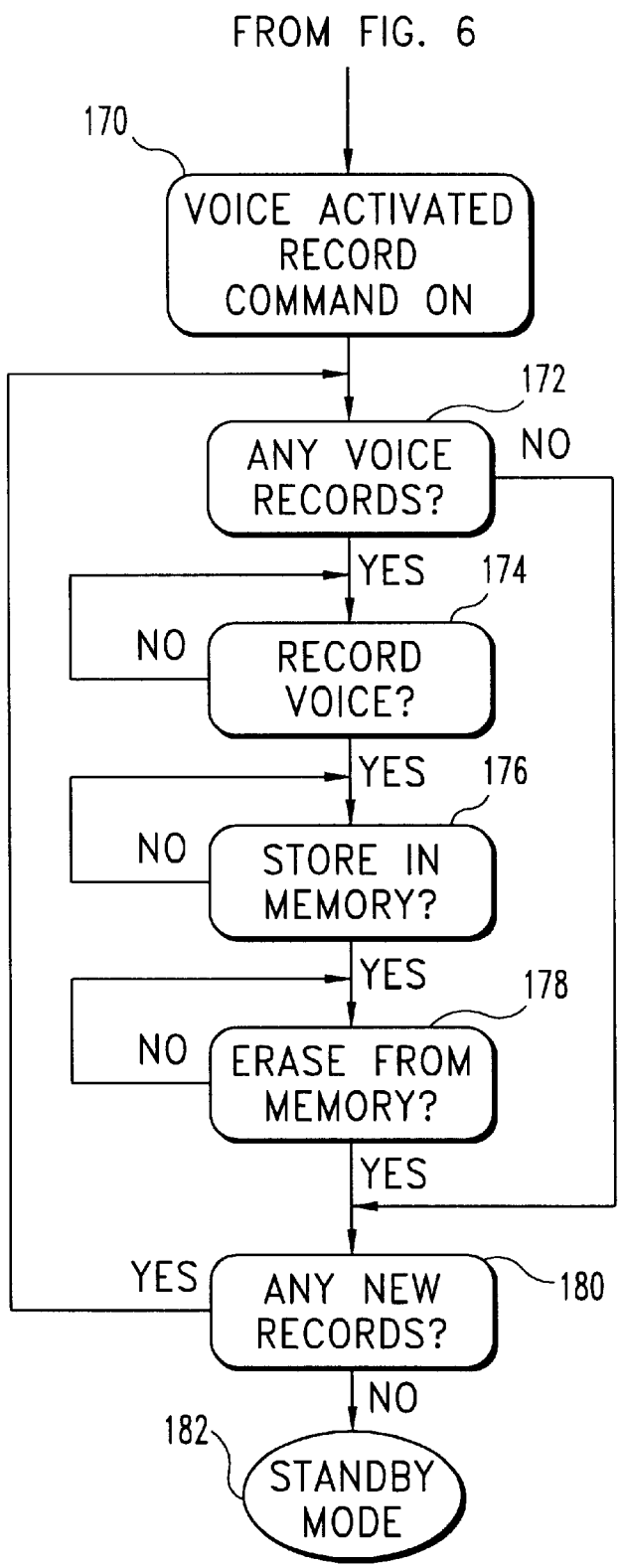
FIG. 8 is a detailed flowchart of a further step shown in the flowchart of FIG. 6 for executing recording commands.

When the telephone headset 10 is first activated by a user, it must be educated as to the user's voice. Thus, if no voice dialing commands are being issued in the flowchart of FIG. 6, then the next step 122 is used to determine whether any record commands are being issued by the user. If so, then control passes to the recording ASIC whose executed steps are shown in FIG. 8. In this step, the voice activated recording commands are turned on in step 170. In the next step 172, the recording ASIC determines whether any recordable voice signals are being received. If so, it is determined in step 174 whether the next spoken words are to be recorded. If so, the user speaks the words and they are stored within the memory 101 in step 176. If the user desires to change the particular recorded words, the last entered information can be erased in step 178. In the following step 180, it is determined whether any new recordings are to be made. If not, control passes to step 182 in which the telephone headset 10 is placed in the standby mode.

Figure 9:
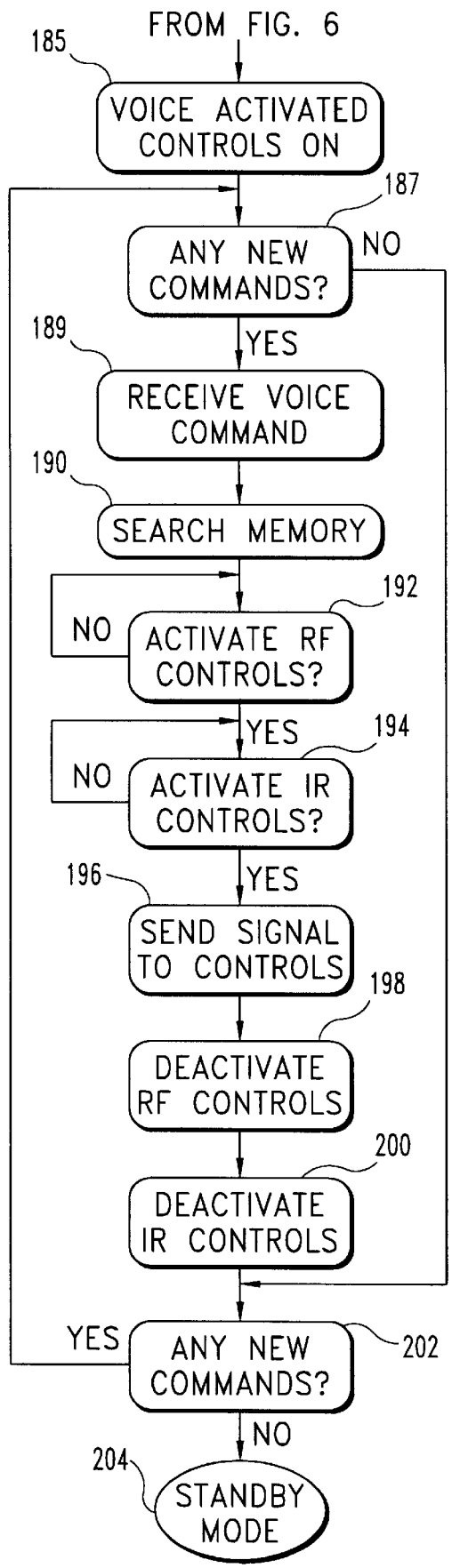
FIG. 9 is a detailed flowchart of another step shown in the flowchart of FIG. 6 for executing voice-activated controls.

Referring back to FIG. 6, step 124 determines whether any specific control commands have been issued by the user. If so, then the control command ASIC is activated to follow the steps shown in FIG. 9. Once the control command ASIC is activated in step 185, it is determined whether any new commands have been issued by the user in step 187. If so, the voice command is received in step 189, and the memory 101 is searched in step 190 to find a match for the particular voice command. In one specific embodiment, these commands can be to activate various RF controls in step 192 or to activate I/R controls in step 194.

Depending upon which controls are activated, the spoken voice command is converted to an electronic signal which is then passed to the appropriate control in step 196. After the control signals have been received by either the RF or I/R control circuitry, the corresponding controls are deactivated in steps 198 and 200. If no further commands are received in step 202, the telephone headset 10 passes to the standby mode in step 204. The audible commands executed by the command control ASIC according to the steps in FIG. 9 can correspond to commands for tuning the RF reception of the telephone headset 10 to a particular base unit 70. In addition, when I/R controls are activated, the commands can give effect to various data transmissions over the I/R channel between the base unit 70 and the telephone headset 10. In some cases, the I/R channel can be used to transmit data to the base unit 70 and through the serial interface 86 to a personal computer. Such data can be spoken words processed through speech synthesizer software to be downloaded to the PC, for subsequent transcription, for instance.

The present invention provides the user with a highly flexible communications device that is not constrained by conventional telephone system limits. For example, the headset 10 can be used in the office and integrated into the local PBX system through the base unit 70. The base unit can be programmed to communicate with the headset on a cellular frequency. The headset allows the user to receive or continue a call anywhere in the office. The same headset can be used for remote cellular communication outside the office. The microprocessor 30 of the headset can issue commands to the cellular interface unit 30 to recognize when the unit is being used as part of the office telephone system and as a remote cellular unit.

The I/R port 89 adds a further dimension to the flexible communications achieved by the present invention. The I/R port permits communication that is not frequency dependent. In other words, while RF or cellular communication requires a unit specific address frequency, I/R communication requires no such limiting address. Thus, two headsets can communicate with each other, or a single base unit 70 can issue broadcast communications over the I/R band. Again, the microprocessor 30 of each headset can include software to recognize that an I/R transmission is being received. Various transmission protocols can be implemented to enable the headset to awake from a standby mode and activate the appropriate IR interface circuitry. If security is an issue, the I/R transmission packets can include password information recognizable only by a specific headset.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. A wearable communications apparatus comprising:
   a mouthpiece having a first end and a second end, and including a speaker mounted to said mouthpiece adjacent said first end and a microphone mounted to said mouthpiece adjacent said second end;
   a central housing having a top end and a bottom end;
   means between said first end of said mouthpiece and said bottom end of said central housing for pivotably mounting said mouthpiece to said central housing, said mouthpiece, including said speaker and said microphone, pivotable to a first position in which said microphone is adjacent the mouth of the user of the apparatus;
   a head-band connected to said top end of said central housing and configured for supporting the apparatus on the head of the user;
   an antenna; and
   electronic communication means for sending and receiving signals through said antenna, said means operable for controlling said speaker in response to received signals and for transmitting signals from said microphone for broadcast over said antenna.

2. The wearable communications apparatus according to claim 1, wherein:
   said mouthpiece includes a first electrical contact array at said first end, said contact array connected to at least said speaker and said microphone; and
   said central housing including said electrical communication means and a corresponding second electrical contact array arranged to provide electrical connection of said electrical communication means with said first contact array only when said mouthpiece is in said first position.

3. The wearable communications apparatus according to claim 2, wherein:
   said mouthpiece contains a power supply; and
   said first and second contact arrays includes a number of contacts in electrical communication with said power supply when said mouthpiece is in said first position, to thereby provide electrical power to said electrical communication means.

4. The wearable communications apparatus according to claim 1, wherein:
   said electronic communications means includes a voice recognition processing unit connectable to said mouthpiece through said first and second contact arrays when said mouthpiece is in said first position,
   said voice recognition processing unit operable to translate verbal utterances received by said microphone into electrical signals usable by said electronic communications means.

5. The wearable communications apparatus according to claim 1, further comprising a base unit, said base unit having means for connection to an existing telephone network, an antenna and means for transmitting signals from the existing network to the antenna for broadcast to said headset.

6. The wearable communications apparatus according to claim 2, further comprising:
   a base unit having a recharging circuit and a third electrical contact array connected to said recharging circuit and corresponding to said first contact array; and
   means, in said base unit, for supporting said mouthpiece when said mouthpiece is rotated to a second position in which said first and second contact arrays are not in electrical contact, and said first and third contact arrays are in electrical contact.

7. The wearable communications apparatus according to claim 1, wherein:
   said mouthpiece includes a power supply electrically connected to said speaker and said microphone.

8. The wearable communications apparatus according to claim 7, wherein said mouthpiece includes a volume control operably connected to said speaker.

9. The wearable communications apparatus according to claim 7, wherein said power supply includes a rechargeable battery.

* * * * *

UNITED STATES PATENT AND TRADEMARK OFFICE
CERTIFICATE OF CORRECTION

PATENT NO.     : 6,236,969 B1
DATED          : May 22, 2001
INVENTOR(S)    : Jonathan P. Ruppert, Thomas M. Hintz and Kathleen M. Hintz It is certified that error appears in the above-identified patent and that said Letters Patent is hereby corrected as shown below:

<u>Column 5,</u>
Line 24, replace "60" with -- 50 --

<u>Column 7,</u>
Line 58, replace "68" with -- 58 --

Signed and Sealed this

Twenty-eighth Day of May, 2002

*Attest:*

*Attesting Officer*

JAMES E. ROGAN
*Director of the United States Patent and Trademark Office*